(12) United States Patent
McDougal et al.

(10) Patent No.: US 10,657,545 B2
(45) Date of Patent: May 19, 2020

(54) ELECTRONIC SERVING SYSTEM

(71) Applicant: FliteBrite, LLC, West Des Moines, IA (US)

(72) Inventors: Ben McDougal, West Des Moines, IA (US); Ethan Davidson, Des Moines, IA (US); Ben Sinclair, Waukee, IA (US)

(73) Assignee: FLITEBRITE, LLC, West Des Moines, IA (US)

( * ) Notice: Subject to any disclaimer, the term of this patent is extended or adjusted under 35 U.S.C. 154(b) by 65 days.

(21) Appl. No.: 15/284,434

(22) Filed: Oct. 3, 2016

(65) Prior Publication Data
US 2017/0098223 A1    Apr. 6, 2017

Related U.S. Application Data

(60) Provisional application No. 62/236,446, filed on Oct. 2, 2015.

(51) Int. Cl.
*G06Q 30/02* (2012.01)
*G06Q 50/12* (2012.01)

(52) U.S. Cl.
CPC ......... *G06Q 30/0201* (2013.01); *G06Q 50/12* (2013.01)

(58) Field of Classification Search
CPC .................................................. G06Q 30/0201
USPC ....................................................... 705/7.29
See application file for complete search history.

(56) References Cited

U.S. PATENT DOCUMENTS

| | | | | |
|---|---|---|---|---|
| D320,722 S | * | 10/1991 | Sanford | D7/701 |
| 5,899,515 A | * | 5/1999 | Burns | B65D 71/50 294/159 |
| 6,964,443 B1 | * | 11/2005 | Newton | A47G 23/0208 206/217 |
| 7,805,959 B2 | * | 10/2010 | Webb | F25D 3/08 62/457.3 |
| 8,272,506 B1 | * | 9/2012 | Flannery | A47G 23/02 206/217 |
| 9,010,759 B2 | * | 4/2015 | McDonnell | A63F 9/00 273/342 |
| D734,099 S | * | 7/2015 | Fissell | D7/553.8 |
| D770,870 S | * | 11/2016 | Nash | D7/551.1 |
| 2004/0054592 A1 | * | 3/2004 | Hernblad | G06Q 20/32 705/15 |
| 2004/0210621 A1 | * | 10/2004 | Antonellis | G06Q 10/087 709/200 |
| 2006/0010037 A1 | * | 1/2006 | Angert | G06Q 10/087 705/15 |
| 2006/0218041 A1 | * | 9/2006 | Mamedrzaev | G06Q 30/02 705/15 |
| 2010/0121722 A1 | * | 5/2010 | Vawter | G06Q 30/0603 705/15 |

(Continued)

OTHER PUBLICATIONS

Russ, Ena; Smark Kitchen Products, Almighty Cutting Board by Jaewan Jeong, Apr. 26, 2012, pp. 1-3 https://www.lushome.com/smart-kitchen-products-almighty-cutting-board-jaewan-jeong/74590.*

(Continued)

*Primary Examiner* — Dylan C White
(74) *Attorney, Agent, or Firm* — Zarley Law Firm, P.L.C.

(57) ABSTRACT

An electronic serving system having an electronic serving device that receives and displays food information based upon food item selections made by a consumer.

10 Claims, 4 Drawing Sheets

(56) References Cited

U.S. PATENT DOCUMENTS

2012/0233002 A1\* 9/2012 Abujbara .............. G06Q 10/06
                                                                               705/15

OTHER PUBLICATIONS

Xu, Edward; Digital Cutting Board offering germ killer, kitchen scale, and interactive recipes display!, Apr. 17, 2012 https://thecoolgadgets.com/author/edward-xu/.\*

\* cited by examiner

ELECTRONIC SERVING SYSTEM

BACKGROUND OF THE INVENTION

This invention is directed to a serving device, and more particularly to an interactive electronic serving device and system.

Serving devices are well known in the art and are used to serve beverages and food items in restaurants, bars, breweries, tasting rooms, and even within the home. Flights are small samples of various food and beverages that are provided to permit consumers to sample a variety of food items, learn more about the food items, and drive increased profit for a food establishment through repurchasing consumers.

Presently, no serving device or method is technology-infused. Presently, serving paddles, boards, platters, and trays are made of various materials with printed indicia or chalkboard sections to provide information about the product.

The problem with existing devices is that consumers, sometimes within minutes, forget part or all of the information related to the individual products. As a result, not only do consumers have difficulty making educated repurchases in the future, but also the food establishment receives no feedback to make informed purchasing and marketing decisions.

SUMMARY OF THE INVENTION

An electronic serving system provided by an electronic serving system service having a computer where food information is stored for various food items and flight groups are stored containing groups of food items. A food establishment is connected to the electronic serving system via an electronic network and to an electronic serving device.

The electronic serving device has a housing with a plurality of food receptacles that receive food items selected by a consumer. A computer is disposed within the housing that receives and presents the food items selected by the consumer with electronic displays.

DETAILED DESCRIPTION OF THE PREFERRED EMBODIMENT

Figure 1:
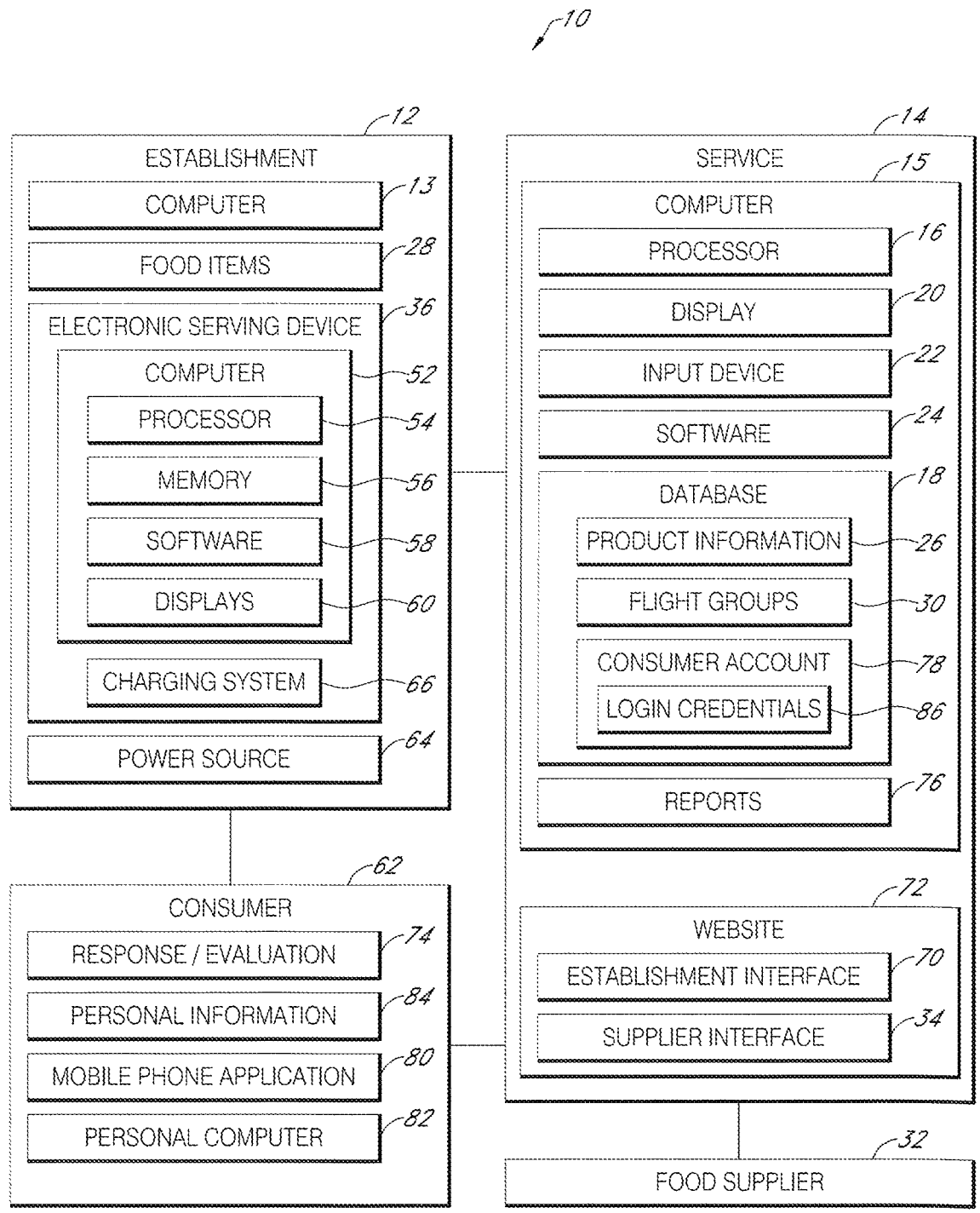
FIG. 1 is a schematic of an environment for an electronic serving system.
Figure 2:
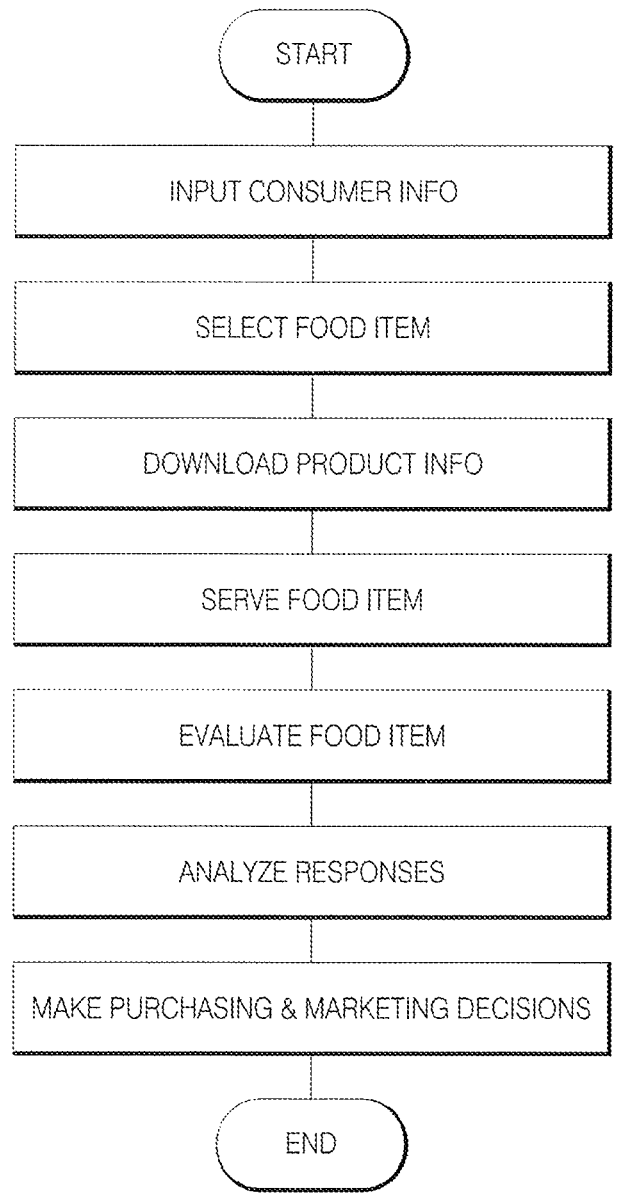
FIG. 2 is a flow diagram of an electronic serving system.
Figure 3:
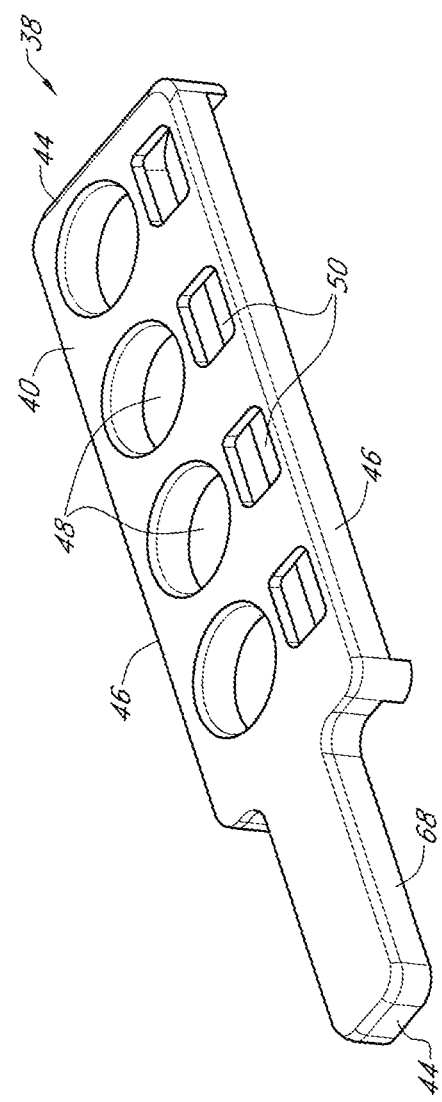
FIG. 3 is a perspective view of an electronic serving device.
Figure 4:
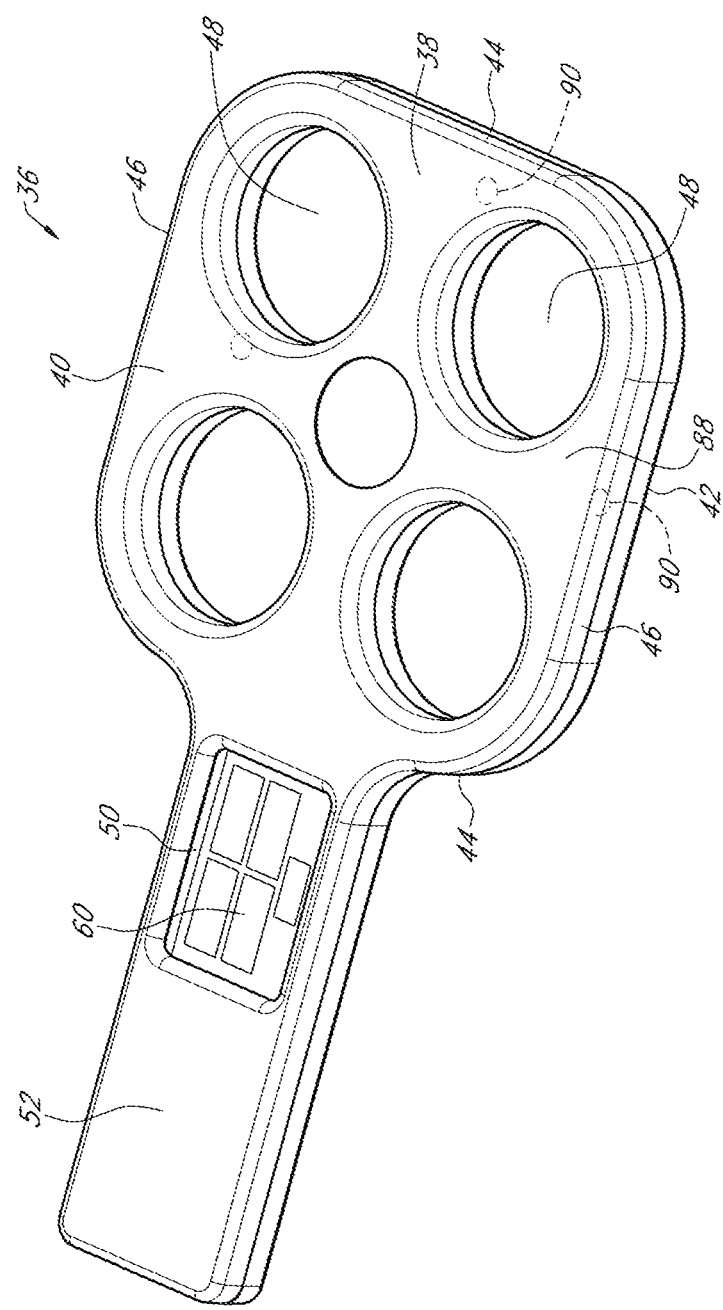
FIG. 4 is a perspective view of an electronic serving device.

Referring to the figures, an electronic serving system 10 is used in relation to a food-serving establishment 12. The food-serving establishment 12 is of any type that serves food and/or beverages, such as a bar, brewery, restaurant, vineyard or the like. The food-serving establishment 12 has a computer 13 that is connected via an electronic network to the Electronic Serving System's service 14. The service 14 has a computer 15, a processor 16, a database 18, a display 20, an input device 22, and software 24. Stored within the database 18 is product information 26 related to a plurality of food items 28. Food items includes, but is not limited to beverages. The food information 26 includes any information related to ingredients, characteristics, origin and the like related to a food item 28. A plurality of food items 28 may be preselected into a pre-determined flight group 30. The product information is input by the establishment 12, the service 14, or supplied/downloaded by a food supplier 32 through a supplier interface 34.

Product information 26 is used in conjunction with an electronic serving device 36. The electronic serving device 36 is of any size, shape, and structure capable of retaining food items and/or food containers and selectively displaying product information 26 related to the food items 28. In one example, the serving device 36 includes a housing 38 having a top 40, a bottom 42, a pair of end walls 44, and a pair of sidewalls 46. A portion of the top 40 of the housing 38 has food receptacles 48. The food receptacles 48 are of any size, shape or structure that receives a food item or food container such as an aperture, a cavity, removable trays or the like. The top 40 of the housing 38 also has one or more display windows 50.

Disposed within the housing 38 is a computer 52 having a processor 54, memory 56, and software 58. The computer 52 is connected to one or more electronic displays 60 that are aligned with display windows 50. The displays 60 are of any type, configured to display product information 26 that permits the establishment 20 and/or the consumer 62 to interact with the display 60, such as the electronic serving device's software 58, mobile phone app 80, physical navigation screen, voice activated screen, joystick, touch screen, or the like. The computer 52 is connected to a power source 64 such as a rechargeable battery that is in communication with a charging system 66. The housing 38 may be formed to have one or more handles 68 or grips. Also, the top 40 of the housing 38 is formed to receive the bottom 42 of another housing 38 so that serving devices may be stacked and/or nested together.

In a preferred example of an electronic serving device 36, the device 36 has a housing 38 that includes an outwardly extending handle 68. The housing 38 is made of wood, plastic, or injected molded and is made as a single piece or has a top section 38A and a bottom section 38B that fit together like a clam shell. A serving portion 88 has a plurality of serving receptacles 48 and a plurality of feet 90 are attached to the bottom 42 of the housing 38. Disposed inside the device 36 is the computer 52 with an electronic display 60, preferably a touch screen, aligned with a display window 50.

In operation, an establishment 12 transfers product information 26 to the service 14 and/or the electronic serving device 36. The transfer occurs in any conventional manner and preferably occurs by accessing the product information 26 through an establishment interface 70 on a website 72 or mobile phone app 80 connected to the service 14 provider's computer 15. As an example, the food establishment 12 accesses the website 72 through its computer 15 or a mobile phone application 80 and provides login information. Once logged on, the food establishment 12 selects food items 28 and flight groups 30 it wishes to offer. The food establishment 12 can also create a flight group 30 by selecting food items 28. The establishment 12 then promotes food items 28 and/or flight groups 30 to the consumer 62. A consumer 62 selects individual food items 28 or a preselected flight group 30.

Once the consumer 62 makes a selection, the establishment 12, using computer 13, downloads product information 26 related to the selected food items 28 to the electronic serving device 36. As an example, using the website 72, the device 36, or a point of sale system, the food establishment 12 selects an electronic serving device 36 and assigns food items 28 or flight groups 30 to the device 36. The download may occur wirelessly. The product information 26 interacts with software 58 and is shown on displays 60 through display window 50. The selected food items 28 are then placed in the food receptacles 48 adjacent the related product information 26 and the serving device 36 is presented to the consumer 62.

The consumer 62 reads the product information 26, and tastes the food items 28, and may also be prompted to re-order a selection and/or input a response/evaluation 74 which is as simple as a like/dislike, personal ratings, comments, or other consumer 62 interactions that can be anonymous or connected to a consumer's account 78.

The computer 13 receives and analyzes any consumer's selections and responses 74 that are imputed and formulates reports 76 related to both. Based upon the reports 76, the establishment 12 can track inventory, make purchasing decisions as well as marketing and promotional decisions. Suppliers 32 may have access to some or all of the reports 76 through the supplier interface 34.

In addition, the consumer 62 may be prompted to establish a consumer account 78 by the serving device 36, website 72 and/or mobile phone app 80. To establish a consumer account 78 the consumer 62 connects to the service 14 through the serving device 36, a mobile phone application 80, or a personal computer 82. The consumer 62 creates a personal account 78 by providing personal information 84 and login credentials 86, both of which are stored in the database 18. The consumer activity and responses/evaluation 74 is also stored in the consumer's account 78. A consumer 62 may access their consumer account 78, the website 72 and/or mobile phone app 80 by entering their login credentials 86. Once accessed, the consumer 62 may review their responses/evaluations 74, manage their consumer account 78 and share activity online. Also, the establishment 12 and/or the service 14 may promote directly to consumers 62 through the website 72, mobile phone app 80, electronic serving device 36 and/or emails based upon selections and responses.

What is claimed is:

1. An electronic serving system, comprising:
    an electronic serving system service having a first computer that stores information related to food items;
    a food establishment having a second computer connected to the first computer and an electronic serving device; wherein food item information is transferred from the first computer to the electronic serving device by the food establishment based upon food item selections made by a consumer and the electronic serving device has a housing with a top, a bottom, a pair of end walls, a pair of side walls, a portion of the top having food receptacles, more than one display window in the top aligned with the food receptacles, a computer disposed within the housing having displays that align with the more than one display windows.

2. The system of claim 1 wherein the information related to food items is part of a flight group that is being served by the food establishment.

3. The system of claim 1 wherein the first computer provides reports based upon the consumer's food item selections.

4. The system of claim 1 wherein the top of the housing is formed to receive the bottom of another housing permitting the housing and the another housing to nest together.

5. The system of claim 1 wherein the housing has a plurality of feet attached to the bottom.

6. The system of claim 1 wherein the electronic display permits an establishment to interact with the more than one display.

7. The system of claim 1 wherein the electronic display permits a consumer to interact with the more than one display.

8. The system of claim 1 wherein the computer is connected to a power source.

9. The system of claim 1 wherein the housing has a handle that extends outwardly from the portion of the top of the housing having food receptacles.

10. An electronic serving system, comprising:
    an electronic serving device having a housing that includes a top, a bottom, end walls, and side walls;
    a portion of the top of the housing has food receptacles and a display window positioned in a handle;
    a computer having a processor, memory, and software disposed within the housing and connected to an electronic display aligned with the display window wherein product information is displayed by the electronic display.

* * * * *